(12) United States Patent
Tan

(10) Patent No.: US 9,928,282 B2
(45) Date of Patent: Mar. 27, 2018

(54) METHOD AND APPARATUS FOR PROVIDING SEARCH RESULTS ON A MOBILE TERMINAL

(71) Applicant: Baidu Online Network Technology (Beijing) Co., LTD., Beijing (CN)

(72) Inventor: Menglong Tan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 393 days.

(21) Appl. No.: 14/412,302

(22) PCT Filed: Oct. 31, 2013

(86) PCT No.: PCT/CN2013/086318
§ 371 (c)(1),
(2) Date: Dec. 31, 2014

(87) PCT Pub. No.: WO2014/067471
PCT Pub. Date: May 8, 2014

(65) Prior Publication Data
US 2015/0347531 A1   Dec. 3, 2015

(30) Foreign Application Priority Data
Oct. 31, 2012  (CN) .......................... 2012 1 0429974

(51) Int. Cl.
*G06F 17/30* (2006.01)
*H04L 29/08* (2006.01)

(52) U.S. Cl.
CPC .. *G06F 17/30554* (2013.01); *G06F 17/30424* (2013.01); *G06F 17/30867* (2013.01); *G06F 17/30905* (2013.01); *H04L 67/02* (2013.01)

(58) Field of Classification Search
CPC .... G06F 9/5044; G06F 9/4843; G06F 3/1255; H04L 67/34
See application file for complete search history.

(56) References Cited

U.S. PATENT DOCUMENTS

2004/0024867 A1* 2/2004 Kjellberg .......... G06F 17/30905
                                                    709/224
2004/0034853 A1   2/2004 Gibbons et al.
(Continued)

FOREIGN PATENT DOCUMENTS

CN        1897529        1/2007
CN      101526952        9/2009
(Continued)

OTHER PUBLICATIONS

Supplement European Search Report for EP13850250 dated May 10, 2016, 2 pages.
(Continued)

*Primary Examiner* — Yuk Ting Choi
(74) *Attorney, Agent, or Firm* — Metis IP LLC

(57) ABSTRACT

An apparatus for providing search results on a mobile terminal includes a page-obtaining module configured to obtain a plurality of candidate pages and terminal-support information corresponding to the candidate page, and a support-information-updating module configured to establish or update page terminal-support information based on the candidate page and its corresponding terminal-support information. The page terminal-support information includes a mapping relationship between one or more groups of page-identification information and their corresponding terminal-support information. The apparatus also has a processing module configured to perform subsequent processing to one or more search results corresponding to the user's mobile query request based on terminal-attribute information of the mobile terminal corresponding to the user and the (Continued)

page terminal-support information, and a providing module configured to provide at least one of the one or more processed search results to an application corresponding to the mobile query request.

16 Claims, 6 Drawing Sheets

(56) References Cited

U.S. PATENT DOCUMENTS

| | | |
|---|---|---|
| 2006/0074880 A1 | 4/2006 | Bukary |
| 2006/0224565 A1 | 10/2006 | Ashutosh et al. |
| 2007/0143306 A1 | 1/2007 | Yang |
| 2009/0111467 A1* | 4/2009 | Chai .................. H04L 41/00 455/435.1 |
| 2010/0262619 A1 | 10/2010 | Zargahi et al. |
| 2011/0029881 A1 | 2/2011 | Smith et al. |
| 2011/0173674 A1* | 7/2011 | Thomson .......... H04L 29/12669 726/1 |
| 2012/0088540 A1* | 4/2012 | Smith .................... H04L 67/303 455/550.1 |
| 2012/0246291 A1* | 9/2012 | Wong ................ G06Q 30/0603 709/224 |
| 2014/0007057 A1* | 1/2014 | Gill .......................... G06F 8/61 717/126 |

FOREIGN PATENT DOCUMENTS

| | | |
|---|---|---|
| CN | 102323937 | 1/2012 |
| CN | 102323937 A | 1/2012 |
| CN | 102368193 | 3/2012 |
| CN | 102420813 | 4/2012 |
| CN | 102521344 | 6/2012 |
| CN | 102663048 | 9/2012 |
| CN | 102930017 | 2/2013 |
| JP | 2010-15203 A | 1/2010 |
| JP | 201015203 | 1/2010 |

OTHER PUBLICATIONS

A Request for the Submission of an Opinion for KR20147036490 dated Feb. 15, 2017, 5 pages.

* cited by examiner

METHOD AND APPARATUS FOR PROVIDING SEARCH RESULTS ON A MOBILE TERMINAL

CROSS REFERENCE TO RELATED APPLICATIONS

This application is the U.S. national stage under 35 USC 371 of international application PCT/CN2013/086318, filed on Oct. 31, 2013, which claims the benefit of the Oct. 31, 2012 priority date of Chinese application 201210429974.2. The contents of all the foregoing are herein incorporated by reference.

FIELD

The present invention relates to the field of Mobile Internet, and in particular to the technology for providing search results on a mobile terminal.

BACKGROUND

With constant development of the mobile Internet, browsable resource types covered on a page become increasingly richer, e.g., textual information, picture information, and multimedia information such as audio and video, etc.; besides, a user may also install various applications (e.g., game, map, etc.) on the intelligent terminal. Apparently, a mobile terminal accessing these pages or applications should also have a corresponding system configuration; otherwise, due to the differences in mobile terminals and mobile terminal browsers, the supported resource types are also different. For example, the browser of a cheaper mobile cannot support online video playing, while an Android mobile phone may support the online video playing; applications supported by mobile phones with Android 2.1 and above likely cannot be installed and used on Android 2.1 below.

Therefore, when users of different mobile terminals or different mobile terminal browsers are performing search, their support degrees on the search results with different resource types are different. If the search results provided to the user only based on the correspondence relationship between the query sequence and the search results, the provided search results are likely incompatible to the mobile terminal or mobile terminal browser of the user, which reduces the user's information obtaining efficiency and user's experience.

SUMMARY

One embodiment of the invention is providing a method and an apparatus for providing search results on a mobile terminal.

According to one embodiment of the invention, a method for providing search results on a mobile terminal is provided, wherein the method obtains a plurality of candidate pages and terminal support information corresponding to the candidate page;

establishes or updates page terminal support information based on the candidate page and its corresponding terminal support information, wherein the page terminal support information includes a mapping relationship between one or more groups of page identification information and their corresponding terminal support information;

wherein the method further:

b. performs subsequent processing to one or more search results corresponding to the user's mobile query request based on terminal attribute information of the mobile terminal corresponding to the user and the page terminal support information;

c. provides at least one of the one or more processed search results to an application corresponding to the mobile query request.

According to another embodiment of the invention, a result providing apparatus for providing search results on a mobile terminal is further provided, wherein the apparatus comprises:

a page obtaining module configured to obtain a plurality of candidate pages and terminal support information corresponding to the candidate page;

a support information updating module configured to establish or update page terminal support information based on the candidate page and its corresponding terminal support information, wherein the page terminal support information includes a mapping relationship between one or more groups of page identification information and their corresponding terminal support information;

wherein the apparatus further comprises:

a processing module configured to perform subsequent processing to one or more search results corresponding to the user's mobile query request based on terminal attribute information of the mobile terminal corresponding to the user and the page terminal support information;

a providing module configured to provide at least one of the one or more processed search results to an application corresponding to the mobile query request.

Compared with the prior art, the present invention establishes or updates page terminal support information based on a plurality of candidate ages and their corresponding terminal support information; the search results corresponding to the mobile query request are subject to subsequent processing based on the page terminal support information in conjunction with terminal attribute information of the mobile terminal corresponding to the user, and the processed search results are provided to the corresponding application. Therefore, the present invention makes user's search results more conformant with the needs, enhances the correlation between the search results and the user device, enhances the efficiency for the user in obtaining information and the resource utilization of the mobile terminal, and improves the user's use experience. Moreover, the present invention may also determine terminal support information corresponding to the candidate page based on page related information of the candidate page, thereby enhancing the diversity and accuracy of obtaining the terminal support information corresponding to the candidate page, and then, enhancing the correlation between the search results and the user device, as well as the resource utilization of the mobile terminal. Moreover, the present invention may also determine terminal related information or candidate terminal support information based on page related information in the candidate page, and then, determine terminal support information, thereby enhancing the plurality and accuracy of obtaining the terminal support information corresponding to the candidate page, and enhancing the correlation between the search results and the user device as well as the resource utilization of the mobile terminal. Moreover, the present invention may also establish or update page terminal support information based on a mapping relationship such as regular expressions, to enhance the plurality and accuracy of obtaining the page terminal support information, and further enhance the correlation between the search results and the user device as well as the resource utilization of the mobile terminal. Moreover, the present invention may also perform subsequent processing to search results based on the desired terminal support information corresponding to the mobile terminal of the user; further, the desired terminal support information may be determined based on reference terminal support information; further, the search results may subject to subsequent processing such as prioritization or screening based on the desired terminal support information. Therefore, the present invention makes user's search results more conformant with the needs, enhances the correlation between the search results and the user device, enhances the efficiency for the user in obtaining information and the resource utilization of the mobile terminal, and improves the user's experience.

BRIEF DESCRIPTION OF THE DRAWINGS

Other features, purposes and advantages of the invention will become more explicit by means of reading the detailed statement of the non-restrictive embodiments made with reference to the accompanying drawings.

Figure 1:
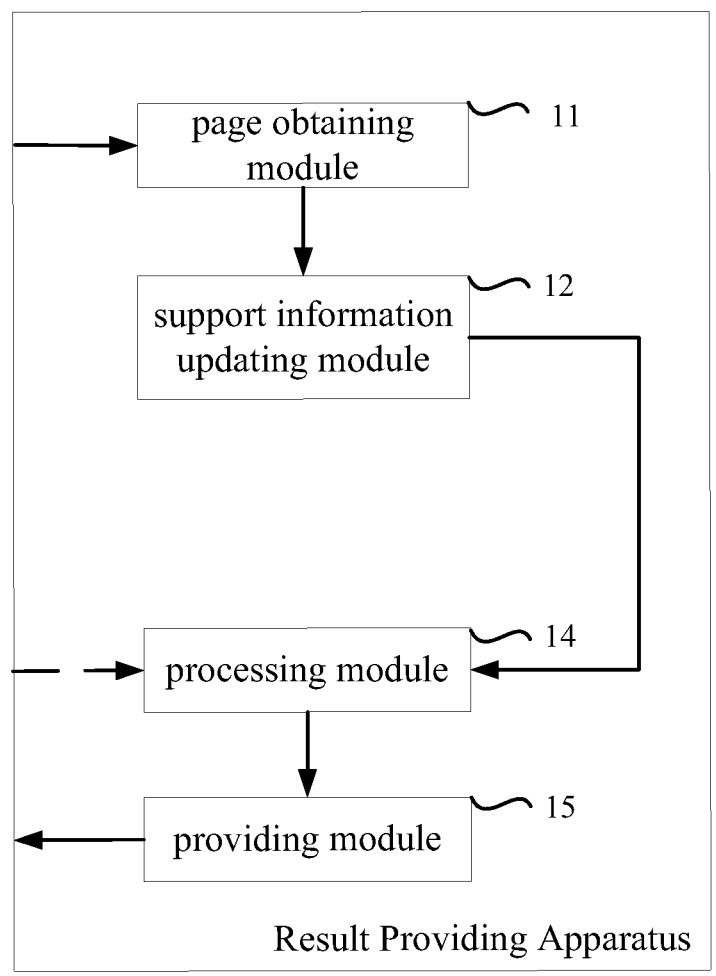
FIG. 1 shows a schematic diagram of the result providing apparatus for providing search results on a mobile terminal according to one aspect of the present invention.

The same or similar reference signs in the drawings represent the same or similar component parts.

DETAILED DESCRIPTION

Below, details of the invention will be further provided in combination with the accompanying drawings.

FIG. 1 shows a schematic diagram of the result providing apparatus for providing search results on a mobile terminal according to one aspect of the present invention; wherein, the result providing apparatus comprises a page obtaining module 11, a support information updating module 12, a processing module 14, a providing module 15. Specifically, the page obtaining module 11 obtains a plurality of candidate pages and terminal support information corresponding to the candidate page; the support information updating module 12 establishes or updates the page terminal support information based on the candidate page and its corresponding terminal support information, wherein the page terminal support information includes a mapping relationship between one or more groups of page identification information and their corresponding terminal support information; the processing module 14 performs subsequent processing to one or more search results corresponding to the user's mobile query request based on terminal attribute information of the mobile terminal corresponding to the user and the page terminal support information; the providing module 15 provides at least one of the one or more processed search results to an application corresponding to the mobile query request. Here, the result providing apparatus includes, but not limited to, network device, user device or a device integrated network device(s) and user device(s) through a network. Here, the network device includes, but not limited to, personal computer(s), network host(s), single network server, a set of multiple network servers or a cloud network formed by multiple servers; herein, the cloud network is formed by a large number of computers or network servers based on Cloud Computing, wherein, the cloud computing is a kind of distributed computing, which is a virtual supercomputer consisting of a group of loosely coupled computers set. The user device includes, but not limited to, any electronic product could process man-machine interaction with the user through keyboard, remote-control unit, touch panel, or acoustic equipment, such as personal computers, smart phones, PDAs, game consoles, or IPTV and so on. The network includes, but not limited to, the Internet, Wide Area Network, Metropolitan Area Network, LAN, VPN, wireless self-organizing network (Ad Hoc network), etc. Those skilled in the art should understand that other result providing apparatus, if applicable to the present invention, should also be included within the protection scope of the present invention and are incorporated here by reference.

The above modules work constantly therebetween. Here, those skilled in the art should understand that "constantly" means the above various modules perform obtaining the candidate pages, establishing or updating the page terminal support information, performing subsequent processing to the search results, providing the processed search results, respectively in real-time or according a preset or real-time adjusted working pattern requirements, until the result providing apparatus stops obtaining a plurality of candidate pages or the one or more search results.

The page obtaining module 11 obtains a plurality of candidate pages and terminal support information corresponding to the candidate page. Specifically, the page obtaining module 11 interacts with other device capable of providing the candidate pages (e.g., a candidate page database) based on various communication protocols, or interacts with a network server corresponding to the candidate pages by obtaining the hyperlinks of the candidate pages, to obtain a plurality of candidate pages; the page obtaining module 11 interacts with other device capable of providing terminal support information corresponding to the candidate pages (e.g., terminal support information database) based on various communication protocols, to obtain the terminal support information corresponding to the candidate page; or directly extracts terminal support information corresponding to the candidate page based on relevant information of the candidate page, e.g., extracting "support Android 2.1 version" in the candidate page information; or, extracts and makes semantic analysis to the information of the candidate page, then obtains the terminal support information, for example, "support Android 2.1 above version", through semantic analysis, can be analyzed to "support Android 2.1 version, support Android 2.2 version, and support Android 2.3 version," etc. Herein, the terminal support information includes, but not limited to machine type information (e.g., mobile phone model, hardware information, operating system type, operating system version, and the like), browser information (e.g., browser type, browser version, etc.), user access information (e.g., access manner, etc.), geographical location information (e.g., user locating information, IP information, etc.). Here, the "Communication Protocol" includes the transfer protocol of computer communication, e.g., TCP/IP, UDP, FTP, ICMP, NetBEUI, etc., or other form of communication existing in the computer, e.g., a communication oriented to the communication between objects within an object programming or a messaging transfer protocol between different programs within the operating system or different modules of the computer.

The support information updating module 12 establishes or updates the page terminal support information based on the candidate page and its corresponding terminal support information, wherein the page terminal support information includes a mapping relationship between one or more groups of page identification information and their corresponding terminal support information. Specifically, the support information updating module 12 establishes or updates, based on the candidate pages and its corresponding terminal support information obtained by the page obtaining module 11, page terminal support information by establishing a mapping or establishing a database with the terminal support information and the page identification information of the candidate page, wherein the page terminal support information comprises one or more sets of mapping relationship between the page identification information and its corresponding terminal support information. Here, when the page identification information already exists, the terminal support information is updated; when the page identification information does not exist yet, the terminal support information is established; the page identification information includes, but not limited to, page URL, page tag, etc. For example, the page identification information of the candidate page is www.12345.com, and its corresponding terminal support information is "support Android 2.1 version, support Android 2.2 version, support Android 2.3 version"; then, when the page terminal support information does not have the page identification, the page terminal support information associated with the page identification is established, and the page identification information is one-to-one mapped to the corresponding to terminal support information, e.g., mapped to "www.12345.com, support Android 2.1 version," "www.12345.com, support Android 2.2 version," and "www.12345.com, support Android 2.3 version," etc.

The processing module 14 performs subsequent processing to one or more search results corresponding to the user's mobile query request based on terminal attribute information of the mobile terminal corresponding to the user and the page terminal support information. Specifically, the processing module 14 interacts with other device capable of providing search results (e.g., a search result database) through various communication protocols, to obtain one or more search results corresponding to the mobile query request submitted by the user; or performs query with respect to the mobile query request submitted by the user to obtain one or more search results corresponding to the mobile query request submitted by the user; and then, through direct interaction with the user, obtains terminal attribute information of the mobile terminal corresponding to the user; or obtains terminal attribute information of the mobile terminal corresponding to the user through performing field extraction to the mobile query request or other manner based on the mobile query request. The processing module 14 performs subsequent processing such as screening, ordering or a combination thereof to the obtained one or more search results based on the terminal attribute information of the mobile terminal corresponding to the user and the page terminal support information established or updated by the support information updating module 12, e.g., the terminal attribute information of the user is that the user terminal system is Android 2.2 version; then, the ordering of the search result pages which can be displayed in the Android 2.2 version or which contains applications available for installation are raised.

The providing module 15 provides at least one of the one or more processed search results to an application corresponding to the mobile query request. Specifically, the providing module 15 obtains processing results by performing subsequent processing to the one or more search results by the processing module 14, and provides at least one of the one or more processed search results to the corresponding application according to the application program interface (API) provided by the application corresponding to the mobile query request or a format requirement of other agreed communication manners such as http, https; or provide at least one of the one or more processed search results to the corresponding application based on the specific requirement of the corresponding application with respect to the search results. Here, the providing manner and the number of search results as provided may be determined based on the user terminal type, network type, and the number of search results, which may also be determined based on the user or default setting of the system.

Preferably, the support information updating module 12 may establish or update page terminal support information based on the candidate page and its corresponding terminal support information, wherein the page terminal support information includes a mapping relationship between one or more groups of page identification information and their corresponding terminal support information, and at least one terminal support information in the mapping relationship comprises a regular expression. Specifically, when the support information updating module 12 establishes or updates the page terminal support information, the relationship between the terminal support information and the page identification information is expressed using regular expressions. For example, a current mapping relationship in which the page identification information simultaneously corresponds to one or more supportable terminal types is expressed with a regular expression. Here, the manner of establishing or updating the page terminal support information is identical or similar to the manner of establishing or updating of the support information updating module 12 in FIG. 1, which will not be detailed here, but is incorporated here by reference.

Figure 2:
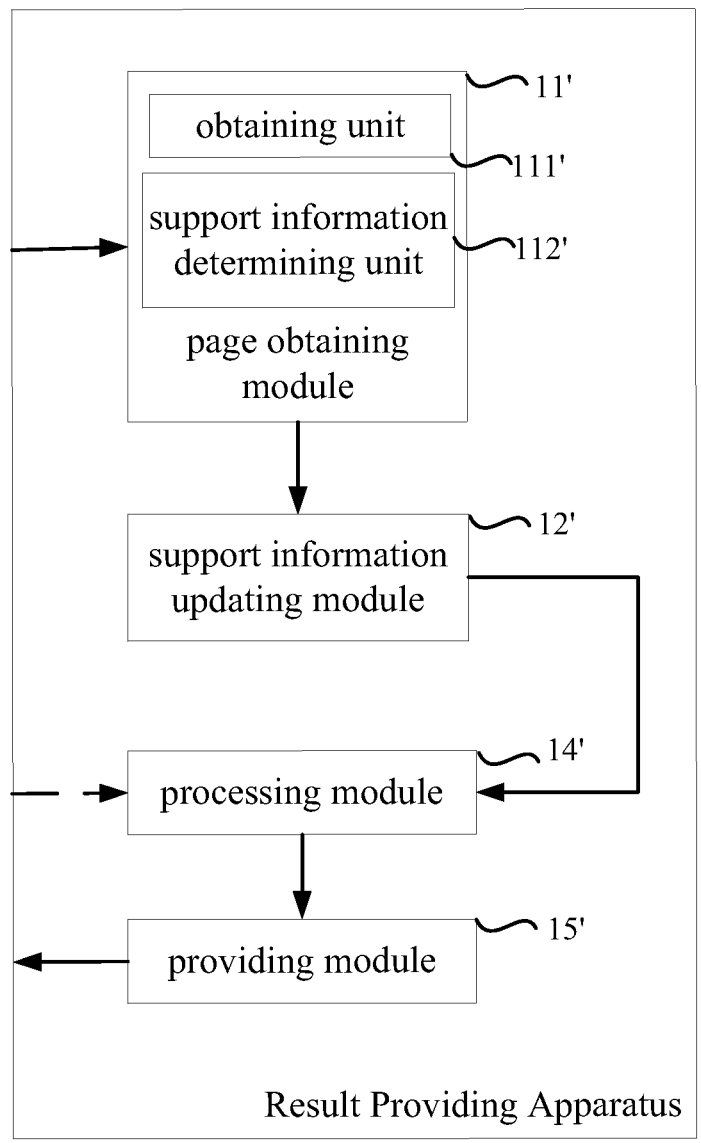
FIG. 2 shows a schematic diagram of the result providing apparatus for providing search results on a mobile terminal according to one preferred embodiment of the present invention.

FIG. 2 shows a schematic diagram of the result providing apparatus for providing search results on a mobile terminal according to one preferred embodiment of the present invention; wherein, the result providing apparatus comprises a page obtaining module 11', a support information updating module 12', a processing module 14', a providing module 15', the page obtaining module 11' comprises an obtaining unit 111' and a support information determining unit 112'. Specifically, the obtaining unit 111' obtains a plurality of candidate pages'; the support information determining unit 112' determines terminal support information corresponding to the candidate page based on the page related information of the candidate page; the support information updating module 12' establishes or updates the page terminal support information based on the candidate page and its corresponding terminal support information, wherein the page terminal support information includes a mapping relationship between one or more groups of page identification information and their corresponding terminal support information; the processing module 14' performs subsequent processing to one or more search results corresponding to the user's mobile query request based on terminal attribute information of the mobile terminal corresponding to the user and the page terminal support information; the providing module 15' provides at least one of the one or more processed search results to an application corresponding to the mobile query request. Herein, the support information updating module 12', the processing module 14', the providing module 15' of the result providing apparatus are identical or substantially identical to corresponding modules shown in FIG. 1, which are thus not detailed here, but incorporated here by reference.

The above modules work constantly therebetween. Here, those skilled in the art should understand that "constantly" means the above various modules perform obtaining the candidate pages, determining terminal support information, establishing or updating the page terminal support information, performing subsequent processing to the search results, providing the processed search results, respectively in real-time or according a preset or real-time adjusted working pattern requirements, until the result providing apparatus stops obtaining a plurality of candidate pages or the one or more search results.

The obtaining unit 111' obtains a plurality of candidate pages. Specifically, the obtaining unit 111' interacts with other device capable of providing candidate pages (e.g., a candidate page database) based on various communications protocols, or interacts with a network server corresponding to the candidate pages through obtaining a hyperlink of the candidate pages, to obtain a plurality of candidate pages. Here, the candidate page includes, but not limit to, information such as the content in the page, source code, and tags and so on. Here, the "communication protocol" comprises a transfer protocol of computer communication, e.g., TCP/IP, UDP, FTP, ICMP, NetBEUI, etc., or other form of communication present in the computer, e.g., communication oriented to the communication between objects within an object programming or a messaging protocol between different programs in an operating system or a messaging protocol between different modules in a computer.

The support information determining unit 112' determines terminal support information corresponding to the candidate page based on page related information of the candidate page. Specifically, the support information determining unit 112' determines the terminal support information corresponding to the candidate page through direct extraction based on the page related information of the candidate page, e.g., extracting "support Android 2.1 version" in the candidate page. Or the support information determining unit 112' extracts the page related information of the candidate page and performs semantic analysis, to obtain the terminal support information, e.g., through semantic analysis, "support Android 2.1 above version" can be resolved as "support Android 2.1 version, support Android 2.2 version, support Android 2.3 version," etc. Or the support information determining unit 112' performs format conversion to the candidate page, e.g., converting the candidate page into a Dom tree; then scans the converted format, e.g., scanning the Dom tree, and extracts text in the same html tag or a proximate html tag, queries the text in a feature character string dictionary, e.g., finding information such as "platform", "version" and the like, and performs resolution. Here, the resolution includes, but not limited to, converting the page related information (e.g., feature character string) into one or more platform or version data by using a mapping table. Here, the terminal support information includes, but not limited to machine information (e.g., mobile phone model, hardware information, operating system type, operating system version, etc.), browser information (e.g., browser type, browser version, etc.), user access information (e.g., access manner, etc.), and geographical location information (e.g., user location information, IP information, etc.). Here, the "communication protocol" includes the transfer protocol of computer communication, e.g., TCP/IP, UDP, FTP, ICMP, NetBEUI, etc., or other form of communication existing in the computer, e.g., a communication oriented to the communication between objects within an object programming or a messaging protocol between different programs within the operating system or different modules of the computer.

Preferably, the page related information includes at least any one of the following:

Page format information of the candidate page, e.g., HTML, XHTML, SHTML, ASPX WML, etc., and the terminal information supported by different page formats might be different;

Character string of terminal feature in the candidate page, e.g., identifying terminal feature character string(s) of the terminal attributes supportable by the candidate page, such as, "support Android 2.1 above version," "AnZhuo" "Android," "Apple," "iPhone," "iOS," "Symbian," "SaiBan," "s60v3," etc.;

Application resource information in the candidate page. Herein, the application resource information includes, but not limited to, app or description information of app, multimedia information like video or audio, etc.; therefore, in the subsequent step, the terminal attribute information corresponding to the page may be determined based on the application resource information in the candidate page through obtaining the terminal attribute information corresponding to the app or video. The reason is that the mobile user might intend to access a page through mobile search, or download a desired app from the access page or watch a video resource.

Preferably, the support information determining unit 112' comprises a page related extracting unit (not shown), a terminal related determining unit (not shown), a first support determining unit (not shown); wherein, the page related extracting unit extracts page related information in the candidate page, wherein the page related information includes application resource information in the candidate page; the terminal related determining unit determines, based on the application resource information, terminal related information of the mobile terminal that may access a resource corresponding to the application resource information; the first support determining unit determines terminal support information corresponding to the candidate page based on the terminal related information. Specifically, the page related extracting unit extracts, from among the candidate page, page related information in the candidate page by performing semantic analysis to page information of the candidate page, or performing keyword extraction or feature character extraction; wherein the page related information includes the application resource information in the candidate page. Here, the application resource information includes, but not limited to, app or description information of app, and multimedia information such as video or audio. The terminal related determining unit determines, based on the application resource information, the terminal related information of the mobile terminal corresponding to the application resource information through performing feature extraction (e.g., obtaining the terminal information or version information supported by app, etc.) with respect to the application resource information, which application resource information may be accessed in the corresponding mobile terminal. The first support determining unit determines, based on the terminal related information, the terminal support information corresponding to the candidate page through merging and sorting the terminal related information, e.g., establishing a correspondence relationship between the candidate page and the terminal information+version information, which is be used as the terminal support information corresponding to the candidate page, and the like.

Preferably, the support information determining unit 112' comprises a candidate support determining unit (not shown) and a second support determining unit (not shown), wherein, the candidate support determining unit determines a plurality of pieces of candidate terminal support information corresponding to the candidate page based on the page related information of the candidate page, wherein the candidate terminal support information corresponds to a part in the page related information; the second support determining unit determines terminal support information corresponding to the candidate page based on the plurality of pieces of candidate terminal support information. Specifically, the candidate support determining unit determines, based on the page related information of the candidate page, one or more pieces of candidate terminal support information corresponding to the page related information through performing semantic analysis and feature character extraction and the like to the page related information, wherein the candidate terminal support information corresponds to a part in the page related information; for example, the page related information includes app application and video resource; the terminal support information corresponding to the app application is Android 2.2 above version, and the terminal support information corresponding to the video resource is any Android version; therefore, the candidate terminal support information is "android 2.2 above version," "any android version." The second support determining unit determines, based on the plurality of pieces of candidate terminal support information, the terminal support information corresponding to the candidate page by system default or customized rules of determining terminal support information. Here, the determining includes, but not limited to, obtaining the intersection set (i.e., obtaining the maximum lower limit of the candidate terminal support information) or obtaining union set (i.e., obtaining the minimum lower limit of the candidate terminal support information) from a plurality of pieces of candidate terminal support information. For example, by obtaining union based on the above example, the "any Android version" is set to the terminal support information corresponding to the candidate page; or the "Android 2.2 above version, app resource" "any Android version, video resource" is set to the terminal support information etc., so as to satisfy different mobile query requests.

Figure 3:
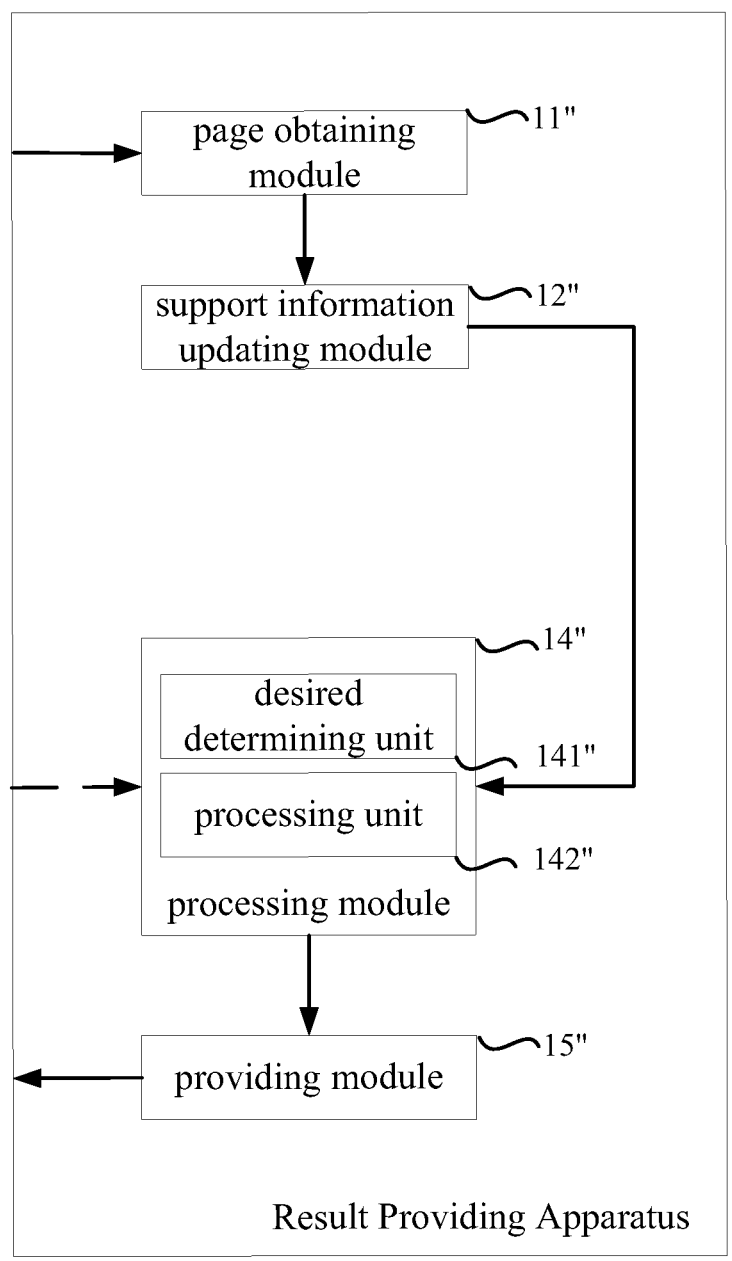
FIG. 3 shows a schematic diagram of the result providing apparatus for providing search results on a mobile terminal according to another preferred embodiment of the present invention.

FIG. 3 shows a schematic diagram of the result providing apparatus for providing search results on a mobile terminal according to another preferred embodiment of the present invention; wherein, the result providing apparatus comprises a page obtaining module 11", a support information updating module 12", a processing module 14", a providing module 15", the processing module 14" comprises a desired determining unit 141" and a processing unit 142". Specifically, the page obtaining module 11" obtains a plurality of candidate pages and terminal support information corresponding to the candidate page; the support information updating module 12" establishes or updates the page terminal support information based on the candidate page and its corresponding terminal support information, wherein the page terminal support information includes a mapping relationship between one or more groups of page identification information and their corresponding terminal support information; the desired determining unit 141" determines desired terminal support information of the search result relative to the mobile terminal based on the terminal attribute information of the mobile terminal corresponding to the user and the page terminal support information; the processing unit 142" performs subsequent processing to the one or more search results based on the desired terminal support information; the providing module 15" provides at least one of the one or more processed search results to an application corresponding to the mobile query request. Herein, the page obtaining module 11", the support information updating module 12", the providing module 15" of the result providing apparatus are identical or substantially identical to corresponding modules shown in FIG. 1, which are thus not detailed here, but incorporated here by reference.

The above modules work constantly therebetween. Here, those skilled in the art should understand that "constantly" means the above various modules perform obtaining the candidate pages, establishing or updating the page terminal support information, determining desired terminal support information, performing subsequent processing to the search results, providing the processed search results, respectively in real-time or according a preset or real-time adjusted working pattern requirements, until the result providing apparatus stops obtaining a plurality of candidate pages or the one or more search results.

The desired determining unit 141" determines desired terminal support information of the search result relative to the mobile terminal based on the terminal attribute information of the mobile terminal corresponding to the user and the page terminal support information. Specifically, the desired determining unit 141" obtains the terminal attribute information of the mobile terminal corresponding to the user through direct interaction with the user, or obtains, based on the mobile query request, the terminal attribute information of the mobile terminal corresponding to the user by performing field extraction and the like to the mobile query request; the desired determining unit 141" processes the obtained one or more search results based on the terminal attribute information of the mobile terminal corresponding to the user and based on the page terminal support information determined by the support information determining module 12", to determine the desired terminal support information of the search result with respect to the mobile terminal. For example, an app application is present in different search results and has different version numbers. When the app application can be installed and used on the mobile terminal of the user based on the user's terminal attribute information, according to the system initialization or machine learning, for a page corresponding to the search result corresponding to a higher app application version or the highest version number of a non-test version, the value corresponding to the desired terminal support information corresponding thereto is the highest.

The processing unit 142" performs subsequent processing to the one or more search results based on the desired terminal support information. The processing unit 142" performs subsequent processing to the search results based on the desired terminal support information, wherein the subsequent processing includes, but not limited to, ordering (e.g., ordering in a descending order according to the scores of the desired terminal support information), screening (e.g., screening out the search results whose desired terminal support information is below a certain threshold, and reserving the search results whose desired terminal support information is above a certain threshold), or a combination of ordering and screening, etc.

Preferably, the desired determining unit 141" comprises a reference determining unit (not shown) and a desired support determining unit (not shown), wherein, the reference determining unit determines, based on terminal attribute information of the mobile terminal corresponding to the user and the page terminal support information, reference terminal support information of a reference result page relative to the mobile terminal, the reference result page corresponds to the search result; the desired support determining unit determines desired terminal support information of the search result relative to the mobile terminal based on the reference terminal support information. Specifically, the reference determining unit obtains the reference page corresponding to the search result through interaction with a corresponding reference page database. For example, the reference determining unit obtains a lower-class page or a upper-class page associated with the search result page based on the search result, or determines, with a page having an identical domain name as the search result page as the reference page, the reference terminal support information of the reference result page corresponding to the search result with respect to the mobile terminal based on the terminal attribute information of the mobile terminal corresponding to the user and the page terminal support information. Here, the manner of determining the reference terminal support information is identical or similar to the manner of determining the page terminal support information of the support information determining module 12 in FIG. 1, which will not be detailed here, but is incorporated here by reference. The desired support determining unit determines, based on the reference terminal support information, the desired terminal support information of the search result relative to the mobile terminal by directly mapping the reference terminal support information to the desired terminal support information corresponding to the current search result or by processing the reference terminal support information (e.g., weighting the page correlation between the reference page and the search result page).

Preferably, the processing unit 142" may determine a priority of the search result based on the desired terminal support information; wherein the providing module 15" provides at least one of the one or more search results to the application based on the priority. Specifically, the processing unit 142" determines a priority of the search result based on the desired terminal support information, for example, in a descending manner according to the scores of the terminal support information or according to the preset priority determining manner for the desired terminal support information. The providing module 15" provides one or more search results with a high priority to the application according to, for example, the priority in descending manner, wherein the providing manner is similar or identical to the providing manner of the providing module 15 in FIG. 1, which will not be detailed here, but is incorporated here by reference.

Preferably, the processing unit 142" may perform a screening processing among the one or more search results based on the desired terminal support information; wherein, the providing module 15" provide at least one of search results obtained from screening to the application. Specifically, the processing module 142" performs a screening processing to the one or more search results based on the desired terminal support information, e.g., filtering off the search results which are not conformant to the mobile terminal of the user, or screening the search results whose desired terminal support information exceeds the set threshold. The providing module 15" provides at least one of screened search results to the application based on the screening results. Herein, the providing manner is identical or similar to the providing manner of the providing module 15 in FIG. 1, which will not be detailed here, but is incorporated here by reference.

Figure 4:
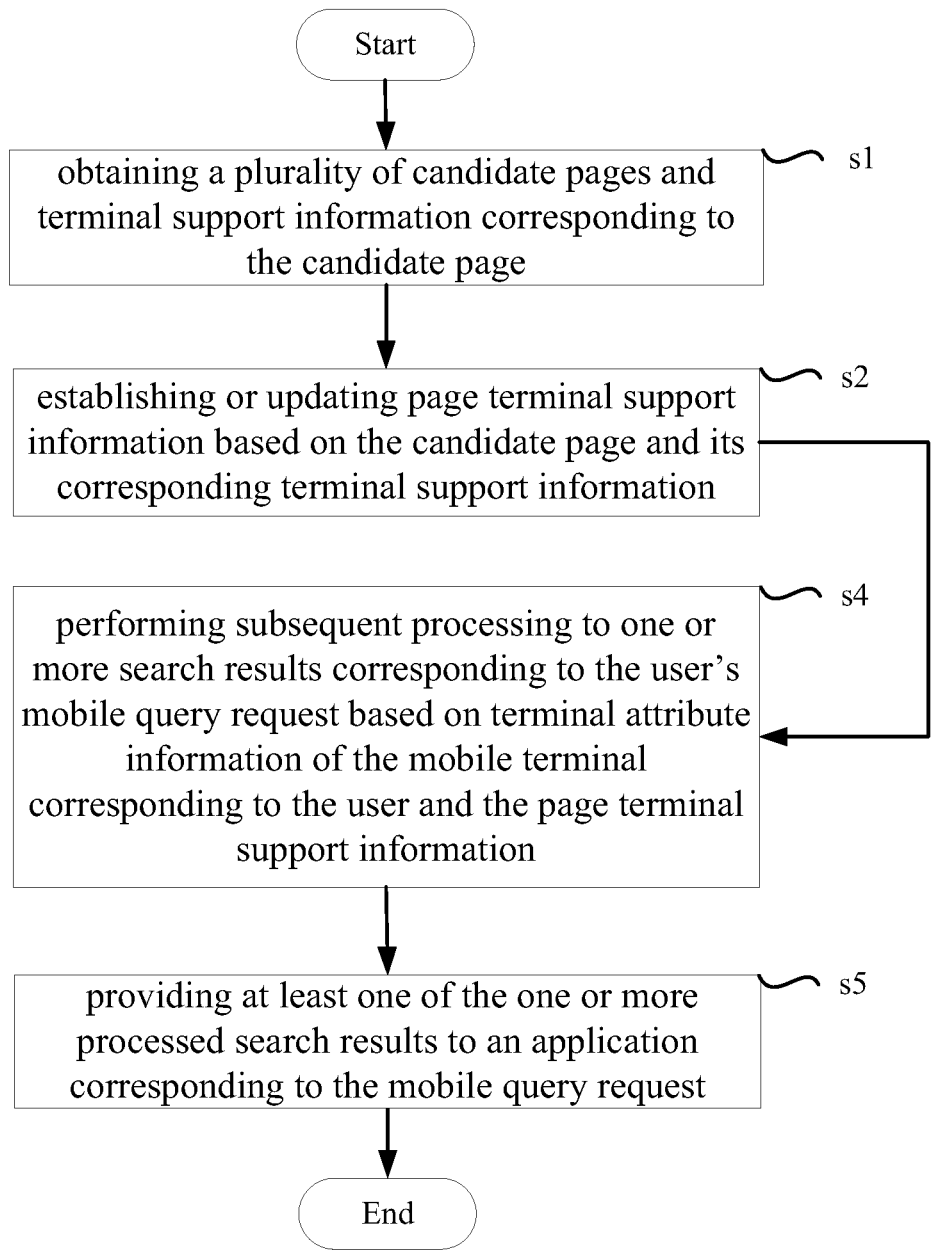
FIG. 4 shows a flow diagram of a method for providing search results on a mobile terminal according to another aspect of the present invention.

FIG. 4 shows a flow diagram of a method for providing search results on a mobile terminal according to another aspect of the present invention. Specifically, in the step s1, the result providing apparatus obtains a plurality of candidate pages and terminal support information corresponding to the candidate page; in the step s2, the result providing apparatus establishes or updates the page terminal support information based on the candidate page and its corresponding terminal support information, wherein the page terminal support information includes a mapping relationship between one or more groups of page identification information and their corresponding terminal support information; in the step s4, the result providing apparatus performs subsequent processing to one or more search results corresponding to the user's mobile query request based on terminal attribute information of the mobile terminal corresponding to the user and the page terminal support information; in the step s5, the result providing apparatus provides at least one of the one or more processed search results to an application corresponding to the mobile query request.

The above steps work constantly therebetween. Here, those skilled in the art should understand that "constantly" means the above various steps perform obtaining the candidate pages, establishing or updating the page terminal support information, performing subsequent processing to the search results, providing the processed search results, respectively in real-time or according a preset or real-time adjusted working pattern requirements, until the result providing apparatus stops obtaining a plurality of candidate pages or the one or more search results.

In the step s1, the result providing apparatus obtains a plurality of candidate pages and terminal support information corresponding to the candidate page. Specifically, in the step s1, the result providing apparatus interacts with other device capable of providing the candidate pages (e.g., a candidate page database) based on various communication protocols, or interacts with a network server corresponding to the candidate pages by obtaining the hyperlinks of the candidate pages, to obtain a plurality of candidate pages; in the step s1, the result providing apparatus interacts with other device capable of providing terminal support information corresponding to the candidate pages (e.g., terminal support information database) based on various communication protocols, to obtain the terminal support information corresponding to the candidate page; or directly extracts terminal support information corresponding to the candidate page based on relevant information of the candidate page, e.g., extracting "support Android 2.1 version" in the candidate page information; or, extracts and makes semantic analysis to the information of the candidate page, then obtains the terminal support information, for example, "support Android 2.1 above version", through semantic analysis, can be analyzed to "support Android 2.1 version, support Android 2.2 version, and support Android 2.3 version," etc. Herein, the terminal support information includes, but not limited to machine type information (e.g., mobile phone model, hardware information, operating system type, operating system version, and the like), browser information (e.g., browser type, browser version, etc.), user access information (e.g., access manner, etc.), geographical location information (e.g., user locating information, IP information, etc.). Here, the "Communication Protocol" includes the transfer protocol of computer communication, e.g., TCP/IP, UDP, FTP, ICMP, NetBEUI, etc., or other form of communication existing in the computer, e.g., a communication oriented to the communication between objects within an object programming or a messaging transfer protocol between different programs within the operating system or different modules of the computer.

In the step s2, the result providing apparatus establishes or updates the page terminal support information based on the candidate page and its corresponding terminal support information, wherein the page terminal support information includes a mapping relationship between one or more groups of page identification information and their corresponding terminal support information. Specifically, in the step s2, the result providing apparatus establishes or updates, based on the candidate pages and its corresponding terminal support information obtained by the step s2, page terminal support information by establishing a mapping or establishing a database with the terminal support information and the page identification of the candidate page, wherein the page terminal support information comprises one or more sets of mapping relationship between the page identification information and its corresponding terminal support information. Here, when the page identification information already exists, the terminal support information is updated; when the page identification information does not exist yet, the terminal support information is established; the page identification information includes, but not limited to, page URL, page tag, etc. For example, the page identification information of the candidate page is www.12345.com, and its corresponding terminal support information is "support Android 2.1 version, support Android 2.2 version, support Android 2.3 version"; then, when the page terminal support information does not have the page identification, the page terminal support information associated with the page identification is established, and the page identification information is one-to-one mapped to the corresponding to terminal support information, e.g., mapped to "www.12345.com, support Android 2.1 version," "www.12345.com, support Android 2.2 version," and "www.12345.com, support Android 2.3 version," etc.

In the step s4, the result providing apparatus performs subsequent processing to one or more search results corresponding to the user's mobile query request based on terminal attribute information of the mobile terminal corresponding to the user and the page terminal support information. Specifically, in the step s4, the result providing apparatus interacts with other device capable of providing search results (e.g., a search result database) through various communication protocols, to obtain one or more search results corresponding to the mobile query request submitted by the user; or performs query with respect to the mobile query request submitted by the user to obtain one or more search results corresponding to the mobile query request submitted by the user; and then, through direct interaction with the user, obtains terminal attribute information of the mobile terminal corresponding to the user; or obtains terminal attribute information of the mobile terminal corresponding to the user through performing field extraction to the mobile query request or other manner based on the mobile query request. In the step s4, the result providing apparatus performs subsequent processing such as screening, ordering or a combination thereof to the obtained one or more search results based on the terminal attribute information of the mobile terminal corresponding to the user and the page terminal support information established or updated by the step s2, e.g., the terminal attribute information of the user is that the user terminal system is Android 2.2 version; then, the ordering of the search result pages which can be displayed in the Android 2.2 version or which contains applications available for installation are raised.

In the step s5, the result providing apparatus provides at least one of the one or more processed search results to an application corresponding to the mobile query request. Specifically, in the step s5, the result providing apparatus obtains processing results by performing subsequent processing to the one or more search results by the step s4, and provides at least one of the one or more processed search results to the corresponding application according to the application program interface (API) provided by the application corresponding to the mobile query request or a format requirement of other agreed communication manners such as http, https; or provide at least one of the one or more processed search results to the corresponding application based on the specific requirement of the corresponding application with respect to the search results. Here, the providing manner and the number of search results as provided may be determined based on the user terminal type, network type, and the number of search results, which may also be determined based on the user or default setting of the system.

Preferably, in the step s2, the result providing apparatus may establish or update page terminal support information based on the candidate page and its corresponding terminal support information, wherein the page terminal support information includes a mapping relationship between one or more groups of page identification information and their corresponding terminal support information, and at least one terminal support information in the mapping relationship comprises a regular expression. Specifically, when in the step s2, the result providing apparatus establishes or updates the page terminal support information, the relationship between the terminal support information and the page identification information is expressed using regular expressions. For example, a current mapping relationship in which the page identification information simultaneously corresponds to one or more supportable terminal types is expressed with a regular expression. Here, the manner of establishing or updating the page terminal support information is identical or similar to the manner of establishing or updating of the step s2 in FIG. 4, which will not be detailed here, but is incorporated here by reference.

Figure 5:
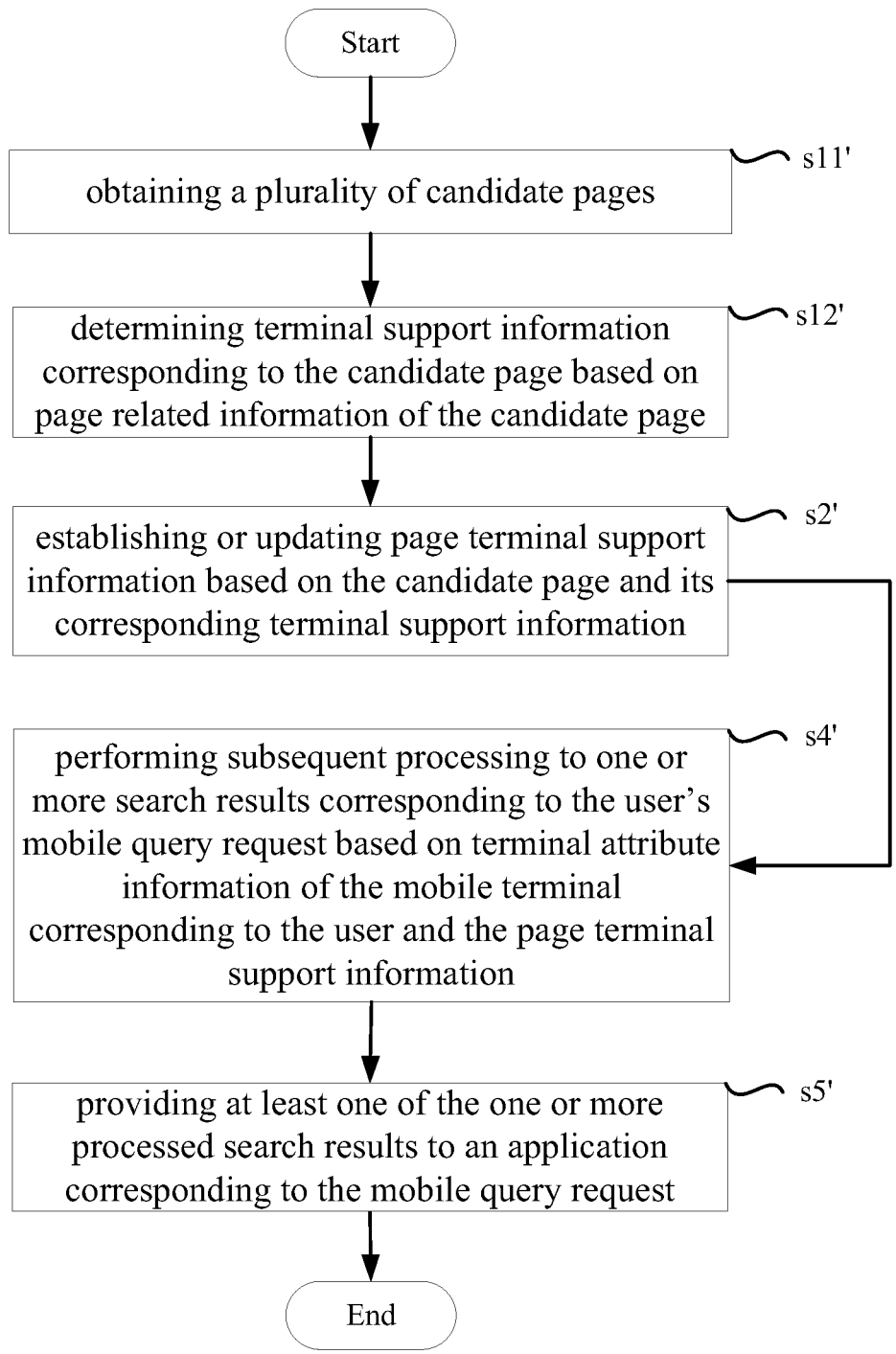
FIG. 5 shows a flow diagram of a method for providing search results on a mobile terminal according to one preferred embodiment of the present invention.

FIG. 5 shows a flow diagram of a method for providing search results on a mobile terminal according to one preferred embodiment of the present invention. Specifically, in the step s11', the result providing apparatus obtains a plurality of candidate pages'; in the step s12', the result providing apparatus determines terminal support information corresponding to the candidate page based on the page related information of the candidate page; in the step s2', the result providing apparatus establishes or updates the page terminal support information based on the candidate page and its corresponding terminal support information, wherein the page terminal support information includes a mapping relationship between one or more groups of page identification information and their corresponding terminal support information; in the step s4', the result providing apparatus performs subsequent processing to one or more search results corresponding to the user's mobile query request based on terminal attribute information of the mobile terminal corresponding to the user and the page terminal support information; in the step s5', the result providing apparatus provides at least one of the one or more processed search results to an application corresponding to the mobile query request. Herein, the step s2', the step s4', the step s5' of the result providing apparatus are identical or substantially identical to corresponding steps shown in FIG. 4, which are thus not detailed here, but incorporated here by reference.

The above steps work constantly therebetween. Here, those skilled in the art should understand that "constantly" means the above various steps perform obtaining the candidate pages, determining terminal support information, establishing or updating the page terminal support information, performing subsequent processing to the search results, providing the processed search results, respectively in real-time or according a preset or real-time adjusted working pattern requirements, until the result providing apparatus stops obtaining a plurality of candidate pages or the one or more search results.

In the step s11', the result providing apparatus obtains a plurality of candidate pages. Specifically, in the step s11', the result providing apparatus interacts with other device capable of providing candidate pages (e.g., a candidate page database) based on various communications protocols, or interacts with a network server corresponding to the candidate pages through obtaining a hyperlink of the candidate pages, to obtain a plurality of candidate pages. Here, the candidate page includes, but not limit to, information such as the content in the page, source code, tags and so on. Here, the "communication protocol" comprises a transfer protocol of computer communication, e.g., TCP/IP, UDP, FTP, ICMP, NetBEUI, etc., or other form of communication present in the computer, e.g., communication oriented to the communication between objects within an object programming or a messaging protocol between different programs in an operating system or a messaging protocol between different modules in a computer.

In the step s12', the result providing apparatus determines terminal support information corresponding to the candidate page based on page related information of the candidate page. Specifically, in the step s12', the result providing apparatus determines the terminal support information corresponding to the candidate page through direct extraction based on the page related information of the candidate page, e.g., extracting "support Android 2.1 version" in the candidate page. Or in the step s12', the result providing apparatus extracts the page related information of the candidate page and performs semantic analysis, to obtain the terminal support information, e.g., through semantic analysis, "support Android 2.1 above version" can be resolved as "support Android 2.1 version, support Android 2.2 version, support Android 2.3 version," etc. Or in the step s12', the result providing apparatus performs format conversion to the candidate page, e.g., converting the candidate page into a Dom tree; then scans the converted format, e.g., scanning the Dom tree, and extracts text in the same html tag or a proximate html tag, queries the text in a feature character string dictionary, e.g., finding information such as "platform", "version" and the like, and performs resolution. Here, the resolution includes, but not limited to, converting the page related information (e.g., feature character string) into one or more platform or version data by using a mapping table. Here, the terminal support information includes, but not limited to, machine information (e.g., mobile phone model, hardware information, operating system type, operating system version, etc.), browser information (e.g., browser type, browser version, etc.), user access information (e.g., access manner, etc.), and geographical location information (e.g., user location information, IP information, etc.). Here, the "communication protocol" includes the transfer protocol of computer communication, e.g., TCP/IP, UDP, FTP, ICMP, NetBEUI, etc., or other form of communication existing in the computer, e.g., a communication oriented to the communication between objects within an object programming or a messaging protocol between different programs within the operating system or different modules of the computer.

Preferably, the page related information includes at least any one of the following:

Page format information of the candidate page, e.g., HTML, XHTML, SHTML, ASPX WML, etc., and the terminal information supported by different page formats might be different;

Character string of terminal feature in the candidate page, e.g., identifying terminal feature character string(s) of the terminal attributes supportable by the candidate page, such as, "support Android 2.1 above version," "AnZhuo" "Android," "Apple," "iPhone," "iOS," "Symbian," "SaiBan," "s60v3," etc.;

Application resource information in the candidate page. Herein, the application resource information includes, but not limited to, app or description information of app, multimedia information like video or audio, etc.; therefore, in the subsequent step, the terminal attribute information corresponding to the page may be determined based on the application resource information in the candidate page through obtaining the terminal attribute information corresponding to the app or video. The reason is that the mobile user might intend to access a page through mobile search, or download a desired app from the access page or watch a video resource.

Preferably, the step s12' comprises a step s121' (not shown), a step s122' (not shown), a step s123' (not shown); wherein, in the step s121', the result providing apparatus extracts page related information in the candidate page, wherein the page related information includes application resource information in the candidate page; in the step s122', the result providing apparatus determines, based on the application resource information, terminal related information of the mobile terminal that may access a resource corresponding to the application resource information; in the step s123', the result providing apparatus determines terminal support information corresponding to the candidate page based on the terminal related information. Specifically, in the step s121', the result providing apparatus extracts, from among the candidate page, page related information in the candidate page by performing semantic analysis to page information of the candidate page, or performing keyword extraction or feature character extraction; wherein the page related information includes the application resource information in the candidate page. Here, the application resource information includes, but not limited to, app or description information of app, and multimedia information such as video or audio. In the step s122', the result providing apparatus determines, based on the application resource information, the terminal related information of the mobile terminal corresponding to the application resource information through performing feature extraction (e.g., obtaining the terminal information or version information supported by app, etc.) with respect to the application resource information, which application resource information may be accessed in the corresponding mobile terminal. In the step s123', the result providing apparatus determines, based on the terminal related information, the terminal support information corresponding to the candidate page through merging and sorting the terminal related information, e.g., establishing a correspondence relationship between the candidate page and the terminal information+version information, which is be used as the terminal support information corresponding to the candidate page, and the like.

Preferably, the step s12' comprises a step s124' (not shown) and a step s125' (not shown), wherein, in the step s124', the result providing apparatus determines a plurality of pieces of candidate terminal support information corresponding to the candidate page based on the page related information of the candidate page, wherein the candidate terminal support information corresponds to a part in the page related information; in the step s125', the result providing apparatus determines terminal support information corresponding to the candidate page based on the plurality of pieces of candidate terminal support information. Specifically, in the step s124', the result providing apparatus determines, based on the page related information of the candidate page, one or more pieces of candidate terminal support information corresponding to the page related information through performing semantic analysis and feature character extraction and the like to the page related information, wherein the candidate terminal support information corresponds to a part in the page related information; for example, the page related information includes app application and video resource; the terminal support information corresponding to the app application is Android 2.2 above version, and the terminal support information corresponding to the video resource is any Android version; therefore, the candidate terminal support information is "android 2.2 above version," "any android version." In the step s125', the result providing apparatus determines, based on the plurality of pieces of candidate terminal support information, the terminal support information corresponding to the candidate page by system default or customized rules of determining terminal support information. Here, the determining includes, but not limited to, obtaining the intersection set (i.e., obtaining the maximum lower limit of the candidate terminal support information) or obtaining union set (i.e., obtaining the minimum lower limit of the candidate terminal support information) from a plurality of pieces of candidate terminal support information. For example, by obtaining union based on the above example, the "any Android version" is set to the terminal support information corresponding to the candidate page; or the "Android 2.2 above version, app resource" "any Android version, video resource" is set to the terminal support information etc., so as to satisfy different mobile query requests.

Figure 6:
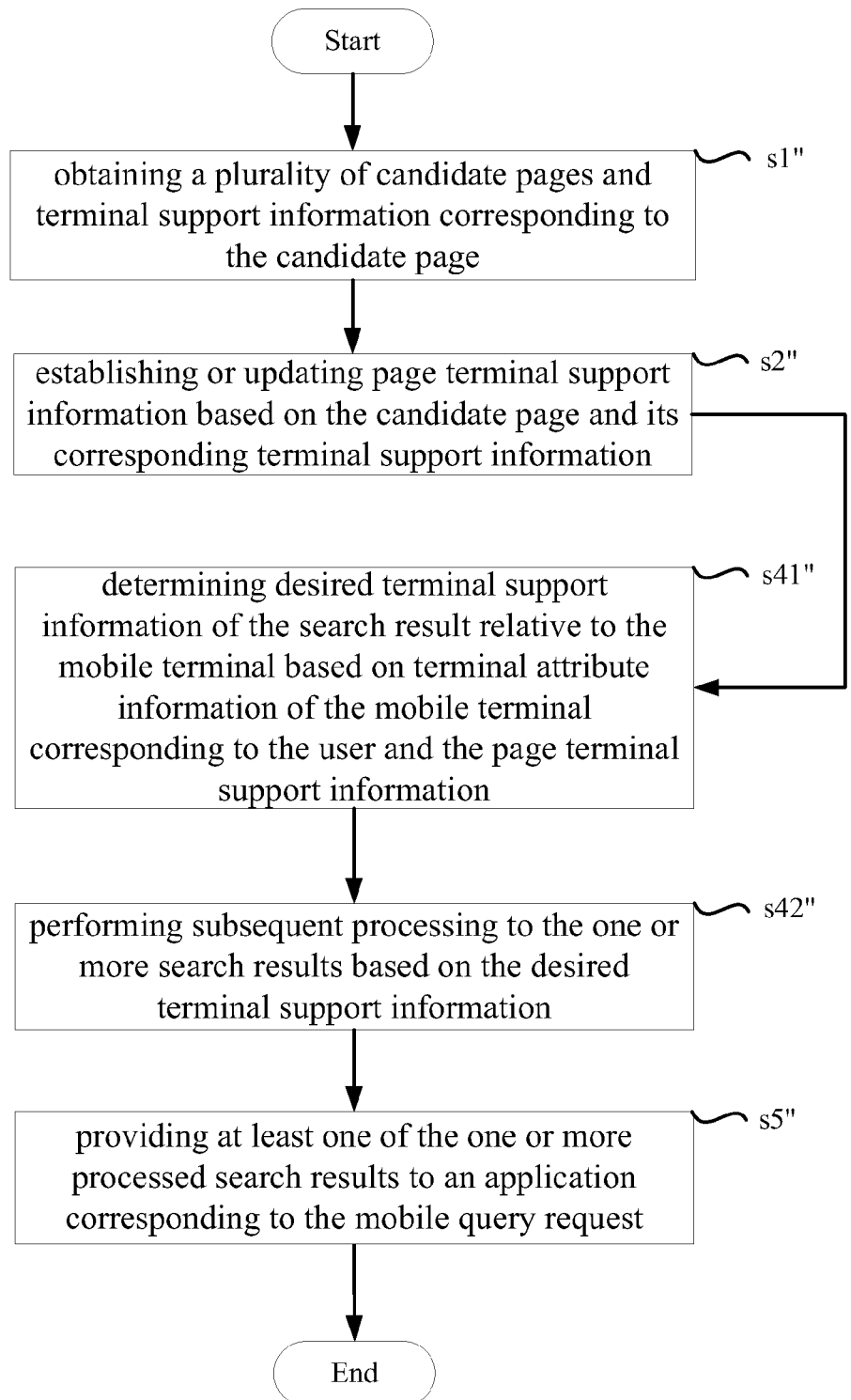
FIG. 6 shows a flow diagram of a method for providing search results on a mobile terminal according to another preferred embodiment of the present invention.

FIG. 6 shows a flow diagram of a method for providing search results on a mobile terminal according to another preferred embodiment of the present invention. Specifically, in the step s1", the result providing apparatus obtains a plurality of candidate pages and terminal support information corresponding to the candidate page; in the step s2", the result providing apparatus establishes or updates the page terminal support information based on the candidate page and its corresponding terminal support information, wherein the page terminal support information includes a mapping relationship between one or more groups of page identification information and their corresponding terminal support information; in the step s41", the result providing apparatus determines desired terminal support information of the search result relative to the mobile terminal based on the terminal attribute information of the mobile terminal corresponding to the user and the page terminal support information; in the step s42", the result providing apparatus performs subsequent processing to the one or more search results based on the desired terminal support information; in the step s5", the result providing apparatus provides at least one of the one or more processed search results to an application corresponding to the mobile query request. Herein, the step s1", the step s2", the step s5" of the result providing apparatus are identical or substantially identical to corresponding steps shown in FIG. 4, which are thus not detailed here, but incorporated here by reference.

The above steps work constantly therebetween. Here, those skilled in the art should understand that "constantly" means the above various steps perform obtaining the candidate pages, establishing or updating the page terminal support information, determining desired terminal support information, performing subsequent processing to the search results, providing the processed search results, respectively in real-time or according a preset or real-time adjusted working pattern requirements, until the result providing apparatus stops obtaining a plurality of candidate pages or the one or more search results.

In the step s41", the result providing apparatus determines desired terminal support information of the search result relative to the mobile terminal based on the terminal attribute information of the mobile terminal corresponding to the user and the page terminal support information. Specifically, in the step s41", the result providing apparatus obtains the terminal attribute information of the mobile terminal corresponding to the user through direct interaction with the user, or obtains, based on the mobile query request, the terminal attribute information of the mobile terminal corresponding to the user by performing field extraction and the like to the mobile query request; in the step s41", the result providing apparatus processes the obtained one or more search results based on the terminal attribute information of the mobile terminal corresponding to the user and based on the page terminal support information determined by the step s2", to determine the desired terminal support information of the search result with respect to the mobile terminal. For example, an app application is present in different search results and has different version numbers. When the app application can be installed and used on the mobile terminal of the user based on the user's terminal attribute information, according to the system initialization or machine learning, for a page corresponding to the search result corresponding to a higher app application version or the highest version number of a non-test version, the value corresponding to the desired terminal support information corresponding thereto is the highest.

In the step s42", the result providing apparatus performs subsequent processing to the one or more search results based on the desired terminal support information. In the step s42", the result providing apparatus performs subsequent processing to the search results based on the desired terminal support information, wherein the subsequent processing includes, but not limited to, ordering (e.g., ordering in a descending order according to the scores of the desired terminal support information), screening (e.g., screening out the search results whose desired terminal support information is below a certain threshold, and reserving the search results whose desired terminal support information is above a certain threshold), or a combination of ordering and screening, etc.

Preferably, the step s41" comprises a step s411" (not shown) and a step s412" (not shown), wherein, in the step s411", the result providing apparatus determines, based on terminal attribute information of the mobile terminal corresponding to the user and the page terminal support information, reference terminal support information of a reference result page relative to the mobile terminal, the reference result page corresponds to the search result; in the step s412", the result providing apparatus determines desired terminal support information of the search result relative to the mobile terminal based on the reference terminal support information. Specifically, in the step s411", the result providing apparatus obtains the reference page corresponding to the search result through interaction with a corresponding reference page database. For example, in the step s411", the result providing apparatus obtains a lower-class page or a upper-class page associated with the search result page based on the search result, or determines, with a page having an identical domain name as the search result page as the reference page, the reference terminal support information of the reference result page corresponding to the search result with respect to the mobile terminal based on the terminal attribute information of the mobile terminal corresponding to the user and the page terminal support information. Here, the manner of determining the reference terminal support information is identical or similar to the manner of determining the page terminal support information of the step s2 in FIG. 4, which will not be detailed here, but is incorporated here by reference. In the step s412", the result providing apparatus determines, based on the reference terminal support information, the desired terminal support information of the search result relative to the mobile terminal by directly mapping the reference terminal support information to the desired terminal support information corresponding to the current search result or by processing the reference terminal support information (e.g., weighting the page correlation between the reference page and the search result page).

Preferably, in the step s42", the result providing apparatus may determine a priority of the search result based on the desired terminal support information; wherein in the step s5", the result providing apparatus provides at least one of the one or more search results to the application based on the priority. Specifically, in the step s42", the result providing apparatus determines a priority of the search result based on the desired terminal support information, for example, in a descending manner according to the scores of the terminal support information or according to the preset priority determining manner for the desired terminal support information. In the step s5", the result providing apparatus provides one or more search results with a high priority to the application according to, for example, the priority in descending manner, wherein the providing manner is similar or identical to the providing manner of the step s5 in FIG. 4, which will not be detailed here, but is incorporated here by reference.

Preferably, in the step s42", the result providing apparatus may perform a screening processing among the one or more search results based on the desired terminal support information; wherein, in the step s42", the result providing apparatus provide at least one of search results obtained from screening to the application. Specifically, in the step s42", the result providing apparatus performs a screening processing to the one or more search results based on the desired terminal support information, e.g., filtering off the search results which are not conformant to the mobile terminal of the user, or screening the search results whose desired terminal support information exceeds the set threshold. In the step s5", the result providing apparatus provides at least one of screened search results to the application based on the screening results. Herein, the providing manner is identical or similar to the providing manner of the step s5 in FIG. 4, which will not be detailed here, but is incorporated here by reference.

Aspects of various embodiments are specified in the claims. Those and other aspects of various embodiments are specified in the following numbered clauses:

1. A method for providing search results on a mobile terminal, comprising:
   x. obtaining a plurality of candidate pages and terminal support information corresponding to the candidate page;
   y. establishing or updating page terminal support information based on the candidate page and its corresponding terminal support information, wherein the page terminal support information includes a mapping relationship between one or more groups of page identification information and their corresponding terminal support information;
   wherein the method further comprising:
   b. performing subsequent processing to one or more search results corresponding to the user's mobile query request based on terminal attribute information of the mobile terminal corresponding to the user and the page terminal support information;
   c. providing at least one of the one or more processed search results to an application corresponding to the mobile query request.

2. The method of clause 1, wherein the step x comprises:
   obtaining a plurality of candidate pages;
   x1. determining terminal support information corresponding to the candidate page based on page related information of the candidate page.

3. The method of clause 2, wherein the page related information includes at least any one of the following:
   page format information of the candidate page;
   character string of terminal feature in the candidate page;
   application resource information in the candidate page.

4. The method of clause 2 or 3, wherein the step x1 comprises:
   extracting page related information in the candidate page, wherein the page related information includes application resource information in the candidate page;
   determining, based on the application resource information, terminal related information of the mobile terminal that may access a resource corresponding to the application resource information;
   determining terminal support information corresponding to the candidate page based on the terminal related information.

5. The method of clause 2 or 3, wherein the step x1 comprises:
   determining a plurality of pieces of candidate terminal support information corresponding to the candidate page based on the page related information of the candidate page, wherein the candidate terminal support information corresponds to a part in the page related information;
   determining terminal support information corresponding to the candidate page based on the plurality of pieces of candidate terminal support information.

6. The method of any one of clauses 1 to 5, wherein the step y comprises:
   establishing or updating page terminal support information based on the candidate page and its corresponding terminal support information, wherein the page terminal support information includes a mapping relationship between one or more groups of page identification information and their corresponding terminal support information, and at least one terminal support information in the mapping relationship comprises a regular expression.

7. The method of any one of clauses 1 to 6, wherein the step b comprises:
   b1. determining desired terminal support information of the search result relative to the mobile terminal based on terminal attribute information of the mobile terminal corresponding to the user and the page terminal support information;
   b2. performing subsequent processing to the one or more search results based on the desired terminal support information.

8. The method of clause 7, wherein the step b1 comprises:
   determining, based on terminal attribute information of the mobile terminal corresponding to the user and the page terminal support information, reference terminal support information of a reference result page relative to the mobile terminal, the reference result page corresponds to the search result;
   determining desired terminal support information of the search result relative to the mobile terminal based on the reference terminal support information.

9. The method of clause 7, wherein the step b2 comprises:
   determining a priority of the search result based on the desired terminal support information;
   wherein the step c comprises:
   providing at least one of the one or more search results to the application based on the priority.

10. The method of clause 7, wherein the step b2 comprises:
    performing a screening processing among the one or more search results based on the desired terminal support information;
    wherein, the step c comprises:
    providing at least one of search results obtained from screening to the application.

11. A result providing apparatus for providing search results on a mobile terminal, wherein the apparatus comprises:
    a page obtaining module configured to obtain a plurality of candidate pages and terminal support information corresponding to the candidate page;
    a support information updating module configured to establish or update page terminal support information based on the candidate page and its corresponding terminal support information, wherein the page terminal support information includes a mapping relationship between one or more groups of page identification information and their corresponding terminal support information;
    wherein the apparatus further comprises:
    a processing module configured to perform subsequent processing to one or more search results corresponding to the user's mobile query request based on terminal attribute information of the mobile terminal corresponding to the user and the page terminal support information;
    a providing module configured to provide at least one of the one or more processed search results to an application corresponding to the mobile query request.

12. The result providing apparatus of clause 11, wherein the page obtaining module comprises:
    an obtaining unit configured to obtain a plurality of candidate pages;
    a support information determining unit configured to determine terminal support information corresponding to the candidate page based on page related information of the candidate page.

13. The result providing apparatus of clause 12, wherein the page related information includes at least any one of the following:
    page format information of the candidate page;
    character string of terminal feature in the candidate page;
    application resource information in the candidate page.

14. The result providing apparatus of clause 12 or 13, wherein the support information determining unit comprises:
    a page related extracting unit configured to extract page related information in the candidate page, wherein the page related information includes application resource information in the candidate page;
    a terminal related determining unit configured to determine, based on the application resource information, terminal related information of the mobile terminal that may access a resource corresponding to the application resource information;
    a first support determining unit configured to determine terminal support information corresponding to the candidate page based on the terminal related information.

15. The result providing apparatus of clause 12 or 13, wherein the support information determining unit comprises:
    a candidate support determining unit configured to determine a plurality of pieces of candidate terminal support information corresponding to the candidate page based on the page related information of the candidate page, wherein the candidate terminal support information corresponds to a part in the page related information;
    a second support determining unit configured to determine terminal support information corresponding to the candidate page based on the plurality of pieces of candidate terminal support information.

16. The result providing apparatus of any one of clauses 11 to 15, wherein the support information updating module is configured to:
    establish or update page terminal support information based on the candidate page and its corresponding terminal support information, wherein the page terminal support information includes a mapping relationship between one or more groups of page identification information and their corresponding terminal support information, and at least one terminal support information in the mapping relationship comprises a regular expression.

17. The result providing apparatus of any one of clauses 11 to 16, wherein the processing module comprises:
    a desired determining unit configured to determine desired terminal support information of the search result relative to the mobile terminal based on terminal attribute information of the mobile terminal corresponding to the user and the page terminal support information;
    a processing unit configured to perform subsequent processing to the one or more search results based on the desired terminal support information.

18. The result providing apparatus of clause 17, wherein the desired determining unit comprises:
    a reference determining unit configured to determine, based on terminal attribute information of the mobile terminal corresponding to the user and the page terminal support information, reference terminal support information of a reference result page relative to the mobile terminal, the reference result page corresponds to the search result;

a desired support determining unit configured to determine desired terminal support information of the search result relative to the mobile terminal based on the reference terminal support information.

19. The result providing apparatus of clause 17, wherein the processing unit is configured to:
   determine a priority of the search result based on the desired terminal support information;
   wherein the providing module is configured to:
   provide at least one of the one or more search results to the application based on the priority.

20. The result providing apparatus of clause 17, wherein the processing unit is configured to:
   perform a screening processing among the one or more search results based on the desired terminal support information;
   wherein, the providing module is configured to:
   provide at least one of search results obtained from screening to the application.

21. A non-transitory computer-readable storage medium, including computer code, which, when being executed, causes a method according to any one of clauses 1-10 to be executed.

To those skilled in the art, apparently the present invention is not limited to the details of the aforementioned exemplary embodiments; moreover, under the premise of not deviating from the spirit or fundamental characteristics of the invention, this invention can be accomplished in other specific forms. Therefore, the embodiments should be considered exemplary and non-restrictive no matter from which point, the scope of the invention is defined by the appended claims instead of the above description, and aims at covering the meanings of the equivalent components falling into the claims and all changes within the scope in this invention. Any reference sign in the claims shall not be deemed as limiting the concerned claims. Besides, apparently the word "comprise/include" does not exclude other components or steps, singular numbers does not exclude complex numbers, the plurality of components or means mentioned in device claims may also be accomplished by one component or means through software or hardware, the wording like first and second are only used to represent names rather than any specific order.

What is claimed is:

1. A method for providing search results on a mobile terminal, comprising:
   based on page related information of plurality of obtained candidate pages, determining terminal support information corresponding to the candidate pages;
   establishing or updating page terminal support information based on the plurality of candidate pages and said corresponding terminal support information, wherein the page terminal support information includes a mapping relationship between one or more groups of page identification information and said corresponding terminal support information;
   wherein the method further comprising:
   determining, based on terminal attribute information of the mobile terminal corresponding to a user and the page terminal support information, reference terminal support information of a reference result page relative to the mobile terminal, the reference result page corresponds to a search result;
   determining, based on the reference terminal support information, desired terminal support information of the search result relative to the mobile terminal by mapping the reference terminal support information to the desired terminal support information corresponding to the search result;
   performing subsequent processing to the one or more search results based on the desired terminal support information;
   providing at least one of the one or more processed search results to an application corresponding to a mobile query request;
   wherein, the terminal support information corresponding to the candidate page includes information about certain capabilities that a device must have to support the candidate page, information that can be derived either directly or indirectly in relation to each candidate page; and
   the reference result page includes a upper-class page or a lower-class page of the search result, or a page having an identical domain name.

2. The method according to claim 1, wherein the determining terminal support information corresponding to the candidate pages comprises:
   obtaining the plurality of the candidate pages based on the mobile query request.

3. The method according to claim 2, wherein the page related information includes at least any one of the following:
   page format information of the candidate pages;
   character string of terminal feature in the candidate pages; or
   application resource information in the candidate pages.

4. The method according to claim 2, wherein the determining terminal support information corresponding to the candidate pages comprises:
   extracting the page related information in the candidate pages, wherein the page related information includes application resource information in the candidate pages;
   determining, based on the application resource information, terminal related information of the mobile terminal that may access a resource corresponding to the application resource information; and
   determining the terminal support information corresponding to the candidate pages based on the terminal related information.

5. The method according to claim 2, wherein the determining terminal support information corresponding to the candidate pages comprises:
   determining a plurality of pieces of candidate terminal support information corresponding to the candidate pages based on the page related information of the candidate pages, wherein the candidate terminal support information corresponds to a part in the page related information; and
   determining the terminal support information corresponding to the candidate pages based on the plurality of pieces of candidate terminal support information.

6. The method according to claim 1, wherein the establishing or updating page terminal support information comprises:
   establishing or updating the page terminal support information based on the candidate pages and said corresponding terminal support information, wherein the page terminal support information includes a mapping relationship between one or more groups of page identification information and said corresponding terminal support information, and at least one terminal support information in the mapping relationship comprises a regular expression.

7. The method according to claim 1, wherein the performing subsequent processing to the one or more search results based on the desired terminal support information comprises:
   determining a priority of the search result based on the desired terminal support information;
   wherein the providing at least one of the one or more processed search results to an application corresponding to the mobile query request comprises:
   providing at least one of the one or more search results to the application based on the priority.

8. The method according to claim 1, wherein the performing subsequent processing to the one or more search results based on the desired terminal support information comprises:
   performing a screening processing among the one or more search results based on the desired terminal support information;
   wherein, the providing at least one of the one or more processed search results to an application corresponding to the mobile query request comprises:
   providing at least one of search results obtained from screening to the application.

9. A result providing apparatus for providing search results on a mobile terminal, the apparatus comprising at least one storage and a processor, further comprising:
   a page obtaining module implemented on the processor and configured to based on page related information of plurality of obtained candidate pages, determine terminal support information corresponding to the candidate pages;
   a support information updating module implemented on the processor and configured to establish or update page terminal support information based on the plurality of candidate pages and said corresponding terminal support information, wherein the page terminal support information includes a mapping relationship between one or more groups of page identification information and said corresponding terminal support information;
   wherein the apparatus further comprising:
   a processing module implemented on the processor and configured to perform subsequent processing to one or more search results corresponding to a user's mobile query request based on terminal attribute information of the mobile terminal corresponding to the user and the page terminal support information;
   a providing module implemented on the processor and configured to provide at least one of the one or more processed search results to an application corresponding to the mobile query request;
   wherein, the processing module comprises:
   a desired determining unit configured to determine desired terminal support information of a search result relative to the mobile terminal based on terminal attribute information of the mobile terminal corresponding to the user and the page terminal support information;
   a processing unit configured to perform subsequent processing to the one or more search results based on the desired terminal support information;
   wherein the desired determining unit comprises:
   a reference determining unit configured to determine, based on the terminal attribute information of the mobile terminal corresponding to the user and the page terminal support information, reference terminal support information of a reference result page relative to the mobile terminal, the reference result page corresponds to the search result;
   a desired support determining unit configured to determine based on the reference terminal support information, the desired terminal support information of the search result relative to the mobile terminal by mapping the reference terminal support information to the desired terminal support information corresponding to the search result;
   wherein, the terminal support information corresponding to the candidate page includes information about certain capabilities that a device must have to support the candidate page, information that can be derived either directly or indirectly in relation to each candidate page; and
   the reference result page includes a upper-class page or a lower-class page of the search result, or a page having an identical domain name.

10. The result providing apparatus according to claim 9, wherein the page obtaining module comprises:
    an obtaining unit configured to obtain the plurality of the candidate pages.

11. The result providing apparatus according to claim 10, wherein the page related information includes at least any one of the following:
    page format information of the candidate pages;
    character string of terminal feature in the candidate pages; or
    application resource information in the candidate pages.

12. The result providing apparatus according to claim 10, wherein the page obtaining module comprises:
    a page related extracting unit configured to extract page related information in the candidate pages, wherein the page related information includes application resource information in the candidate pages;
    a terminal related determining unit configured to determine, based on the application resource information, terminal related information of the mobile terminal that may access a resource corresponding to the application resource information; and
    a first support determining unit configured to determine the terminal support information corresponding to the candidate pages based on the terminal related information.

13. The result providing apparatus according to claim 10, wherein the page obtaining module comprises:
    a candidate support determining unit configured to determine a plurality of pieces of candidate terminal support information corresponding to the candidate pages based on the page related information of the candidate pages, wherein the candidate terminal support information corresponds to a part in the page related information; and
    a second support determining unit configured to determine the terminal support information corresponding to the candidate pages based on the plurality of pieces of candidate terminal support information.

14. The result providing apparatus according to claim 9, wherein the support information updating module is configured to:
    establish or update the page terminal support information based on the candidate pages and said corresponding terminal support information, wherein the page terminal support information includes a mapping relationship between one or more groups of page identification information and said corresponding terminal support information, and at least one terminal support information in the mapping relationship comprises a regular expression.

15. The result providing apparatus according to claim 9, wherein the processing unit is configured to:
- determine a priority of the search result based on the desired terminal support information;
- wherein the providing module is configured to:
- provide at least one of the one or more search results to the application based on the priority.

16. The result providing apparatus according to claim 9, wherein the processing unit is configured to:
- perform a screening processing among the one or more search results based on the desired terminal support information;
- wherein, the providing module is configured to:
- provide at least one of search results obtained from screening to the application.

* * * * *